United States Patent
Maciejczyk

(10) Patent No.: US 10,953,774 B2
(45) Date of Patent: Mar. 23, 2021

(54) STRAP INDICATOR

(71) Applicant: BRIT AX CHILDCARE PTY LTD., Port Melbourne (AU)

(72) Inventor: Wieslaw Maciejczyk, Port Melbourne (AU)

(73) Assignee: BRITAX CHILDCARE PTY LTD., Victoria (AU)

( * ) Notice: Subject to any disclaimer, the term of this patent is extended or adjusted under 35 U.S.C. 154(b) by 0 days.

(21) Appl. No.: 16/262,103

(22) Filed: Jan. 30, 2019

(65) Prior Publication Data
US 2019/0232827 A1 Aug. 1, 2019

(30) Foreign Application Priority Data
Jan. 31, 2018 (AU) .................... 2018900291

(51) Int. Cl.
*B60N 2/28* (2006.01)
*B60R 22/48* (2006.01)

(52) U.S. Cl.
CPC .... *B60N 2/2809* (2013.01); *B60N 2002/2815* (2013.01); *B60R 2022/4841* (2013.01)

(58) Field of Classification Search
CPC .. B60N 2/2809; B60N 2/2806; B60N 2/2803; B60N 2/28; B60N 2/26; B60N 2002/2815; B60N 2002/4841
USPC ........................................ 297/254
See application file for complete search history.

(56) References Cited

U.S. PATENT DOCUMENTS

| | | | |
|---|---|---|---|
| 5,630,645 A * | 5/1997 | Lumley | B60N 2/2809 297/250.1 |
| 5,738,259 A * | 4/1998 | Allen | B60R 9/06 224/493 |
| 6,264,236 B1 * | 7/2001 | Aoki | B60N 2/002 180/268 |
| 9,174,554 B2 * | 11/2015 | Maciejczyk | B60N 2/265 |
| 2005/0006934 A1 * | 1/2005 | Rabeony | B60N 2/2809 297/250.1 |
| 2005/0280297 A1 * | 12/2005 | Patterson | B60N 2/002 297/217.4 |
| 2007/0114774 A1 * | 5/2007 | Lang | B60R 22/28 280/801.1 |
| 2008/0072404 A1 * | 3/2008 | Wetter | B60R 22/12 24/68 R |
| 2008/0251002 A1 * | 10/2008 | Burleigh | B60N 2/2809 116/212 |
| 2008/0296944 A1 * | 12/2008 | Nakagawa | B60N 2/2809 297/250.1 |
| 2011/0140491 A1 * | 6/2011 | Williams | B60N 2/2806 297/256.16 |

* cited by examiner

*Primary Examiner* — Mark R Wendell
(74) *Attorney, Agent, or Firm* — K&L Gates LLP

(57) ABSTRACT

The invention is an indicator means on a strap to provide a means of showing when slack in the strap is removed and/or tension is applied to the strap. The strap is secured with respect to an object at one end and to an anchor point at the other end and the indicator means shows visually that the strap has at least had all slack removed therefrom and where the indicator means is arranged to provide an indication from both sides of the strap to allow a visual indication of tension regardless of which direction the strap extends away from the object.

15 Claims, 4 Drawing Sheets

STRAP INDICATOR

This application claims priority to Australian application number 2018900291 filed Jan. 31, 2018, the entire contents of which are hereby incorporated by reference in its entirety.

FIELD OF THE INVENTION

This invention relates to a strap indicator used with a connecting strap to provide a visual indication of tension in the strap and/or the removal of unacceptable slack within the connection strap.

BACKGROUND

Examples of such connection straps are tether straps used with motor vehicle child safety seats. One of these straps, top tether straps, is used to secure the head end of a child safety seat with respect to an anchorage location on the vehicle. Due to the different configuration of motor vehicle rear seats from one model to another and the location of the anchorage point in relation to the seat, the tether strap is adjustable in length so that the strap is can be brought to the correct tension by the user during installation of the safety seat.

A significant safety concern is the possibility for a child safety seat to be installed in a vehicle with incorrect tension being applied to the tether strap. Of particular concern is if the strap is slack.

Clearly, it is undesirable if the strap is not tight or has actual slackness. This would mean that the head end of the safety seat would be able to move forward until the strap became tight. However, even if there is no slack in the strap, it may still be able to be tightened further. There will be some elasticity in the strap as well as give in the vehicle seat and safety seat which will mean that some tension should be applied to the strap to ensure less forward movement of the seat than might otherwise be the case.

The installation of the safety seat is unsatisfactory where the tether strap has slack and inadequate tension. Without the tether strap being adjusted to have some tension, the head end of the safety seat is able to move forward and may move beyond acceptable allowable limits in a collision.

One form of existing tension indication for straps is to make use of an elastic member with each end of the elastic member secured to a bite of a strap. In this case, the bite of the strap is a semi-circular loop where the length of the loop exceeds the length of the elastic member connecting the bite. Tension applied to the strap will result in the elastic member stretching and in turn straightening of the bite or loop. This movement can be used to reveal a visual indication of applied tension. For example, a coloured section of material may be secured to the tether strap which is hidden when there is no tension in the tether strap but is exposed, such as extending from a cover. When tension is applied to the tether strap, the elastic member is stretched and the bite of the tether strap straightens and reveals the coloured section. This provides a visual indication of the tether strap being under some tension.

A problem with existing tension indicators is they only provide an indication with one orientation of the strap. In the case of a convertible child seat which is capable of being positioned on a vehicle seat both in a forward and rearward facing position, it would result in the indication of tension being only provided when the strap is in one position. However, the tether strap for a convertible safety seat needs to extend in opposite directions away from the head end of the safety seat and therefore there is a need to overcome the problem of providing a visual indication with the tether strap in not just one orientation but both orientations.

The present invention provides an alternative indication arrangement which overcomes the above problem.

SUMMARY OF THE INVENTION

In one aspect, the invention is an indicator means on a strap, where the strap is secured with respect to an object at one end and to an anchor point at the other end and where the indicator means shows that the strap has at least had all slack removed therefrom, wherein the indicator means provides an indication from both sides of the strap to allow an indication of tension regardless of which direction the strap extends away from the object.

In accordance with this aspect of the invention, an indicator means may comprise an indicator surface located on both sides of the strap that become visible once the required tension is applied to the strap. Regardless of whether the strap has an indicator surface on both sides or uses an alternative method, it will be such that it provides a visual indication from both sides of the strap so that the direction of the strap away from the object does not matter.

In one aspect of the invention, the indicator means may comprise an indicator portion on each side of the strap that are concealed with respect to the object when the strap is in a slack state and that become visible by movement of the strap to reveal the indicator portions when they move out of concealment.

The indicator means may include an elastic member such as an elastic strip, metal spring or a portion of elastomeric material which has its ends secured to the tether strap so that a bite of the tether strap loops between the ends of the elastic member. In this way, the elastic member is stretched as the tether strap is tensioned allowing further extension of the tether strap until all of the tension is born by the tether strap. Upon release of the tension, the elastic member retracts the tether strap until the elastic member returns to its initial position which can be used to reveal or conceal the indicator means. The extent of tension that will result in the required amount of stretch of the elastic member can be adjusted by varying the resilience of the elastic member. A less resilient elastic member will result in higher tensions in the strap at the point when the indicator means operates.

In a further aspect, the invention is an indicator means on a tether strap, the tether strap being used on a safety seat to secure the head end of the safety seat with respect to a motor vehicle, comprising:
 a tether strap secured to the head end of the safety seat and an anchor point, wherein the tether strap extends from both sides of the head end of the safety seat to the anchor point, and
 tension indicator portions on both sides of a portion of the tether strap where the tension indicator portions move between a concealed position when no tension is applied to the tether strap and a revealed position when tension is applied to the tether strap.

In accordance with the above description, at least one of the tension indicator portions will remain visible regardless of whether the safety seat is in a forward or rearward facing position.

The indicator means of the tether strap at the head end of the safety seat may be concealed either by trim used to cover the safety seat or in a position behind the headrest portion of the safety seat. The tether strap may be secured to the safety seat within the head end of the safety seat and exit slots in either side of the safety seat with the tether strap extending from or retracting into each slot providing the means by which the tension indicator portions are revealed or concealed.

An elastic member may be secured with respect to the tether strap to allow a portion of the tether strap to be retracted from the slot once tension is applied to the tether strap and to cause it to be retracted into the slot once the tension is removed. The elastic member may be secured with respect to the tether strap so that a bite or a loop of the tether strap is held out of view within the head end of the safety seat and before the slot. Once tension is applied to the tether strap, it extends from within the slot to reveal the tension indicator portion. As the tension indicator portion is located on either side of the tether strap, it will be visible regardless of the direction the tether strap extends away from the head end of the safety seat.

The tether strap extends to the anchor point from both sides of the head end of the safety seat and preferably, indicator means is provided on both portions of the tether strap adjacent each respective side of the safety seat. However, the invention also includes an indicator means on one side of the safety seat only.

In order to fully understand the invention, a preferred embodiment will be described however it will be realised that the scope of the invention is not to be restricted to the precise details of this preferred embodiment and that variations that would be apparent to a skilled addressee are still within the scope of the invention.

BRIEF DESCRIPTION OF THE DRAWINGS

This embodiment is illustrated in the following drawings in which.

DETAILED DESCRIPTION OF AN EXAMPLE EMBODIMENT

Figure 1:
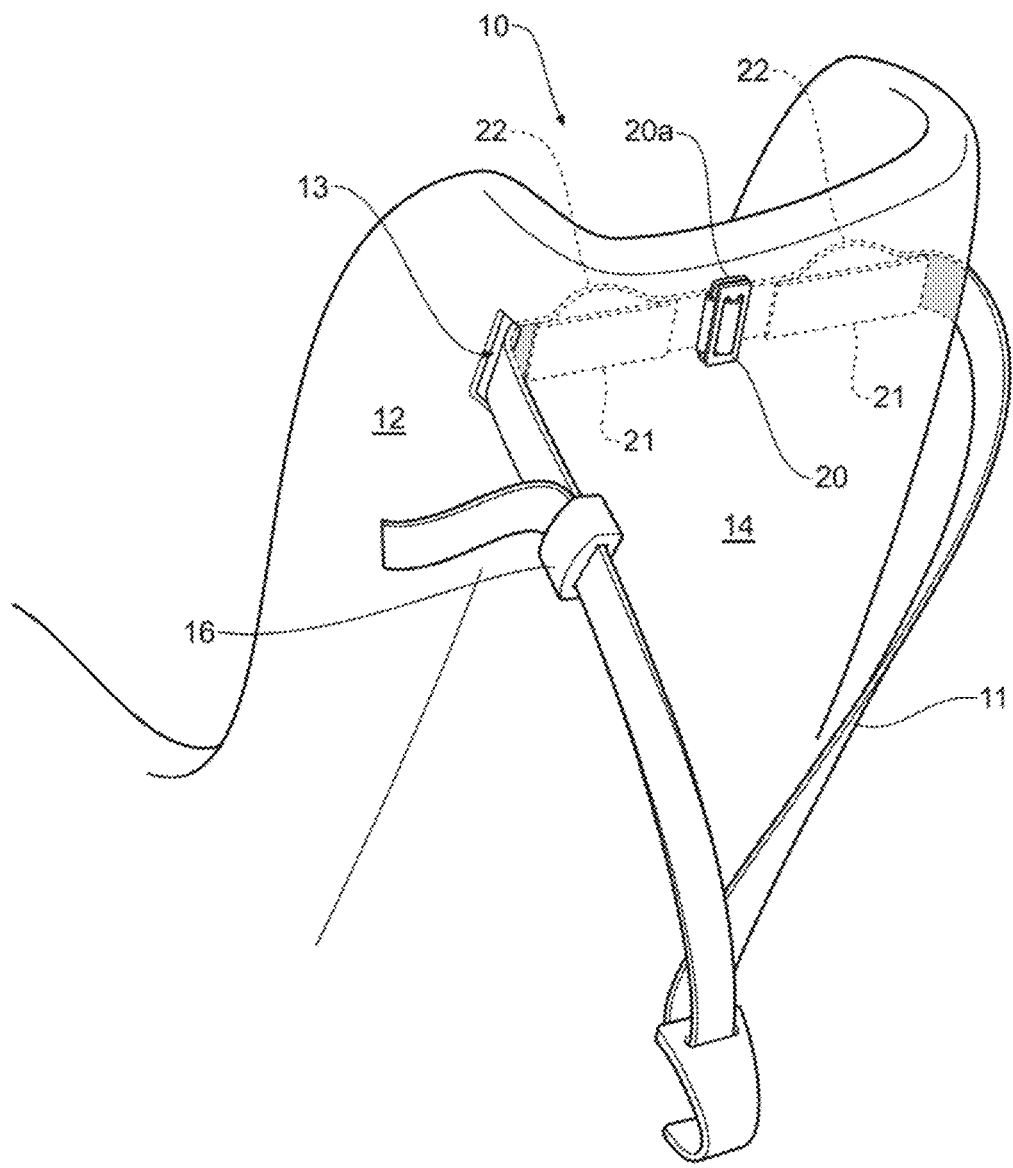
FIG. 1 shows a rear view of a head end of a safety seat including a tether strap attached in accordance with one embodiment.

In FIG. 1, a safety seat 10 has a tether strap 11 secured at its head end. In this embodiment, the tether strap 11 extends through apertures 13 that are located in the side wings 12 of the safety seat 10 with the tether strap 11 being secured to the safety seat 10 within its head end. The safety seat 10 is moulded from polypropylene and is a unitary moulding having a wall thickness of between 3 mm-5 mm. However, it will be appreciated that other materials and manufacturing methods could be used such as solid moulding in polystyrene foam, vacuum forming and blow moulding.

The tether strap 11 comprises a length of webbing that extends away from either side of the safety seat 10. Two portions of the tether strap 11 are joined by an adjustable connector 16 which allows the length of the tether strap 11 to be adjusted. A latch connector 17 is slidably attached by locating the tether strap 11 through aperture 18. The latch connector 17 enables the tether strap 11 to be secured with respect to an anchorage location (not shown) on a motor vehicle parcel shelf. Once the latch connector 17 is attached to the anchorage location, the length of the tether strap 11 can be adjusted via adjustable connector 16 to securely hold the safety seat 10 with respect to the motor vehicle seat.

It is important that all slack is removed from the tether strap 11 and that adequate tension is applied to the tether strap in order to ensure safe installation of the safety seat 10. The invention as described below will provide a means of visually indicating when all slack is removed through adequate tension being applied to the tether strap 11.

As seen in FIG. 1, the tether strap 11 is secured to the backrest portion 14 of the safety seat 10 via the combination of a three bar slide 20 and a two bar slide 20a. On either side of the slides 20 and 20a, and still behind the backrest 14, elastic members 21 are secured to the tether strap 11 so that a bite or loop 22 is formed in the tether strap 11. Each end of each elastic member 21 is secured by being stitched to the tether strap 11. The elastic member 21 may comprise a rubber or elasticated strap or elastomeric member. When the elastic member 21 is in its relaxed state, the loop 22 is held in position. As tension is applied to the tether strap, the elastic member 21 stretches and the loop 22 straightens. This results in the tether strap 11 extending out of the slots 13. This in turn reveals indicator portions 23 that are held behind the backrest 14 and before the slots 13. Accordingly, the tension indicator portions 23 are hidden when the tether strap 11 is in an untensioned relaxed state, but are revealed once tension is applied to the tether strap 11 and the loops 22 straighten. In this embodiment, the indicator means comprises the combination of elastic member 21, the loop 22 and the indicator portions 23.

Figure 2:
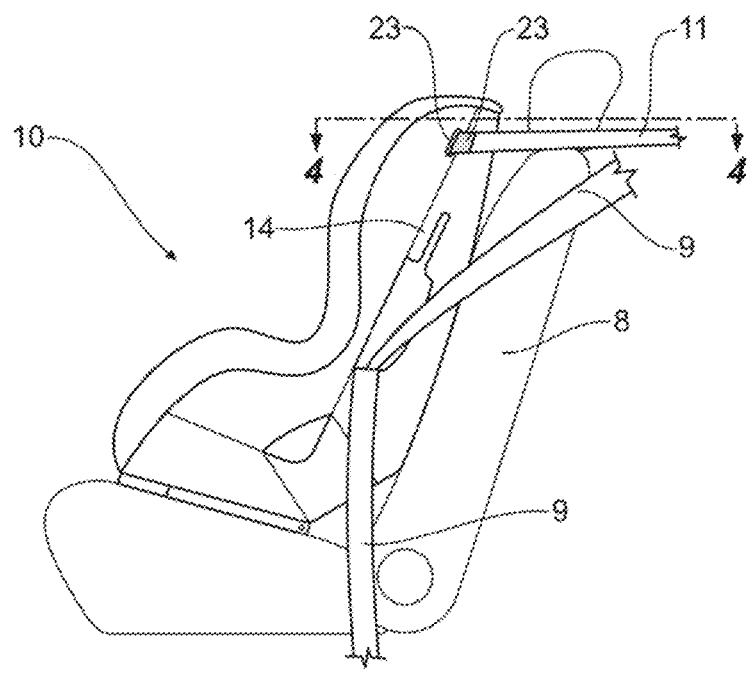
FIG. 2 shows a safety seat installed on a motor vehicle seat in a forward facing position.
Figure 3:
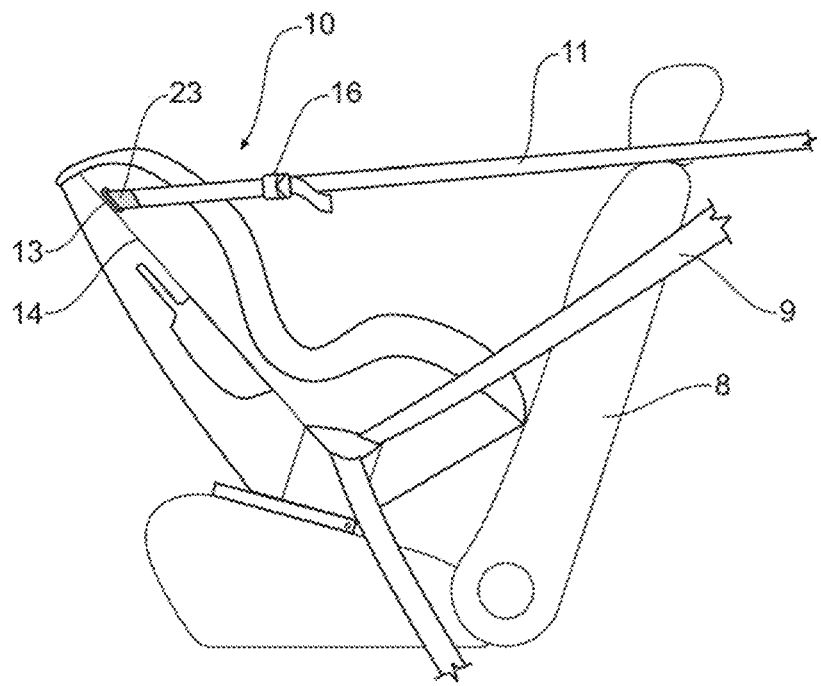
FIG. 3 shows a safety seat installed on a motor vehicle seat in a rearward facing position.

FIGS. 2 and 3 show the safety seat 10 installed in two different orientations on a motor vehicle seat 8. FIG. 2 shows a forward facing configuration and FIG. 3 shows a rear facing configuration. In the forward facing configuration, the tether strap 11 extends rearwardly of the head end of the safety seat 10. In the rear facing configuration shown in FIG. 3, the tether strap 11 extends forwardly of the head end of the safety seat 10. By placing the indicator portions 23 on both sides of the tether strap 11, a visual indication is provided in both configurations of the safety seat 10.

Figure 4:
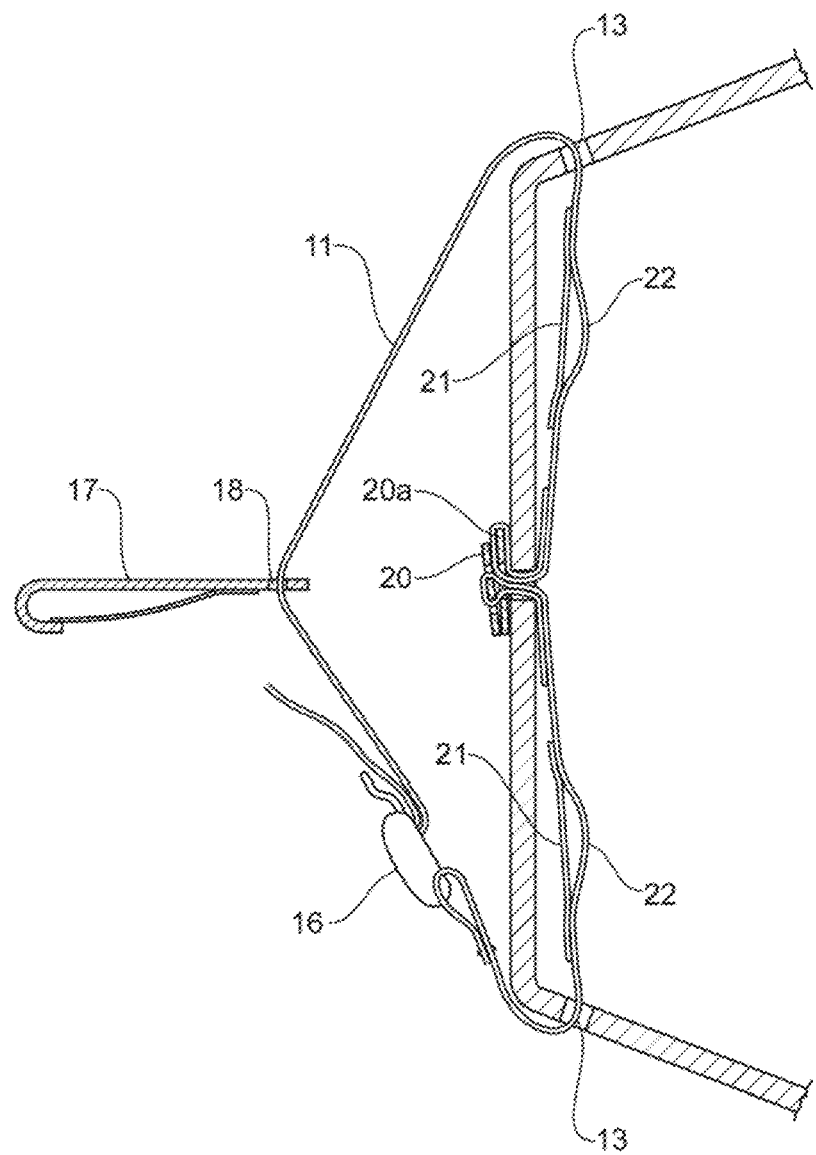
FIG. 4 shows a cross-section of the head end of a safety seat about line 4-4 from FIG. 2.

FIG. 4 shows a cross-section view of the head end of the safety seat 10 about line 4-4 in FIG. 2. It shows the tether strap 11 secured by the two slides 20 and 20a and the tether strap 11 extending out of apertures 13 in the wall of the safety seat 10. The elastic members 21 are located within the safety seat 10 between the apertures 13. They are secured at each end to the tether strap 11 to form loop portions 22. In the relaxed state, as shown in FIG. 4, the elastic members 21 hold the tether strap in a position shown. The indicator portions 23 on each side of the tether strap 11 (not shown in FIG. 4) are held within the safety seat 10 between the apertures 13 and are therefore not visible.

Once tension is applied to the tether strap 11 the elastic members 21 are stretched and the loop portions 22 of the tether strap 11 straighten allowing for the portion of the tether strap 11 holding the indication portions 23 to extend out of the apertures 13. Once this occurs, the indicator portions 23 become visible. As the indicator portions 23 are on each side of the tether strap 11, they will be visible when the safety seat 10 is in either the forward or rearward configuration.

Figure 5A:
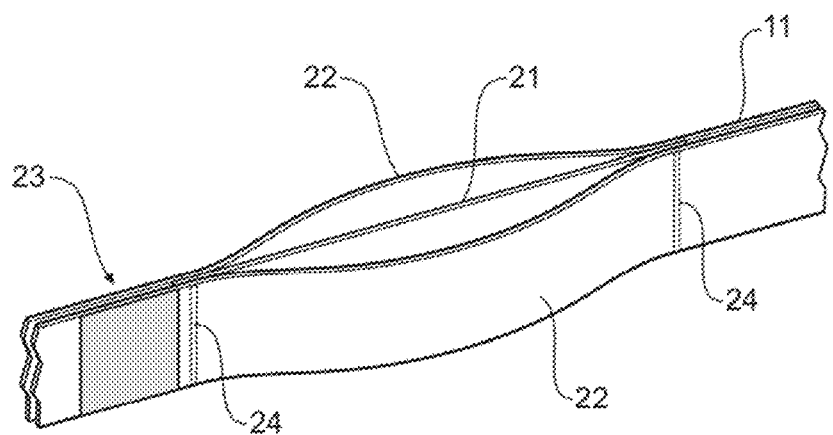
FIGS. 5a and 5b show an elastic member secured to a tether strap with an attached tension indicator portion.
Figure 5B:
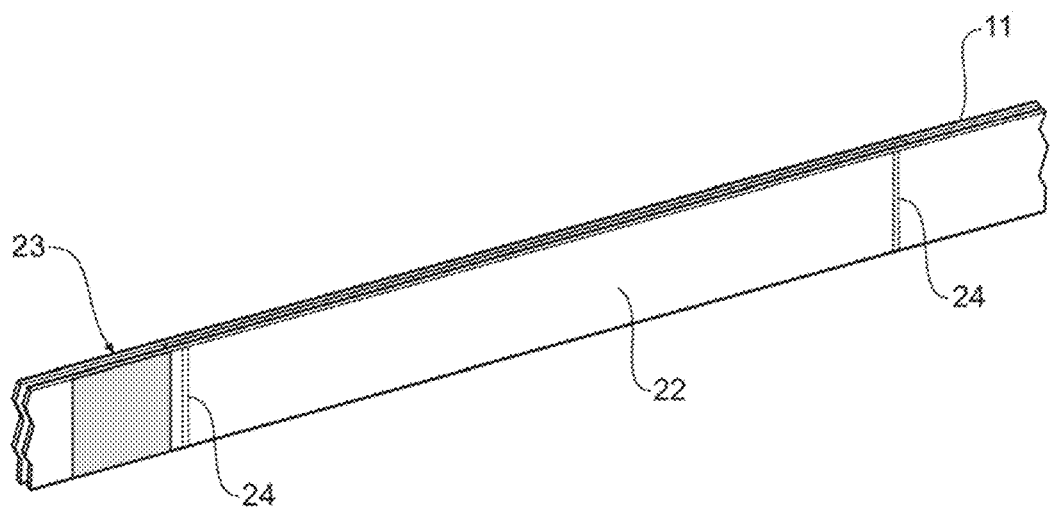

FIGS. 5a and 5b show an alternative construction for incorporating the elastic members 21 into the tether strap 11. In this embodiment, the tether strap 11 between the apertures 13 comprises a sandwich of two strap elements with the elastic member 21 stitched between the two strap elements to create a loop portion 22 on either side of the elastic member 21. As seen in FIG. 5a, the elastic member 21 is stitched at 24 at each end to be held between the strap elements that are part of the tether strap 11. The indicator portions 23 are positioned at one side of the loop portions 22 and FIG. 5b illustrates the tether strap 11 with tension showing the movement of the indicator portion 23.

The elastic members 21 may comprise elasticated fabric, but also may comprise a strip of elastomeric material such as rubber. In addition, metal springs may also be substituted and work equally as well.

The location of the indicator portions 23 on either side of the tether strap ensure that a visual indication is provided once tension is applied to the tether strap regardless of the direction that the tether strap leads away from the safety seat 10. The elastic member 21 has sufficient tension to ensure that it will not commence stretching until tension is placed into the tether strap 11. In this way, a visual indication is provided once all slack is removed and will assist in ensuring correct installation of the child safety seat 10.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth.

The invention claimed is:

1. An indicator means on a strap, wherein the strap is secured to a child safety seat at one end and to an anchor point at the other end; and
    wherein the indicator means shows that the strap has at least had all slack removed therefrom by revealing an indicator portion of the indicator means when the indicator portion passes through an aperture in the child safety seat due to the strap being extended, wherein the indicator portion is disposed on opposing sides of a same portion of the strap and provides an indication of tension from both sides of the strap regardless of whether the strap extends to the anchor point and away from the child safety seat positioned on a vehicle seat in a forward facing position or a rearward facing position.

2. The indicator means according to claim 1 further including an elastic member which has ends of the elastic member secured to the strap so that a bite of the strap loops between the ends of the elastic member, the elastic member acting to pull the indicator portion out of view when no tension is applied to the strap but which allows the indicator portion to come into view once tension is applied to the strap.

3. The indicator means according to claim 2 wherein the indicator portions are a colour different to the colour of the strap.

4. The indicator means according to claim 1 wherein a head end of the safety seat has a slot on each side through which the strap passes, wherein the tension indicator portions are configured to be within the head end of the child safety seat when no tension is applied to the strap and move out past the aperture and into view when tension is applied to the strap.

5. The indicator means according to claim 1 wherein a head end of the safety seat has a slot on each side through which the strap passes, wherein the tension indicator portion is configured to move from an out of view position behind a back rest portion of the child safety seat and pass through the aperture in the child safety seat adjacent the to the back rest portion due to the strap being extended to allow the indication of tension from both sides of the strap.

6. The indicator means according to claim 1 further comprising an elastic member secured to the strap to form a bite in the strap that extends between ends of the elastic member, the elastic member acting to pull the indicator portion through the aperture in the child safety seat and out of view into a space behind the back rest portion of the child safety seat when no tension is applied to the tether strap.

7. The indicator means according to claim 1 wherein strap is secured to the child safety seat at a securing location behind a back rest portion of the child safety seat,
    wherein the indicator portion is disposed in a space behind the back rest portion of the child safety seat and between the securing location and the aperture when no tension is applied to the tether strap.

8. An indicator means for a child safety seat for positioning within to a motor vehicle, the indicator means comprising:
    a tether strap secured to a head end of the child safety seat and configured to be secured to an anchor point, wherein the tether strap extends from both sides of the head end of the child safety seat to the anchor point;
    a first set of tension indicator portions on both sides of a first portion of the tether strap and a second set of tension indicators portions on both sides of a second portion of the tether strap, wherein the tension indicator portions move between a concealed position when no tension is applied to the tether strap and a revealed position when tension is applied to the tether strap thereby extending the tether strap and causing the tension indicator portions to pass through a first aperture in the child safety seat to be revealed;
    a first elastic member secured to the tether strap form a first bite in the tether strap that extends between ends of the first elastic member, the first elastic member acting to pull the first set of tension indicator portions through the first aperture in the child safety seal and out of view when no tension is applied to the tether strap;
    a second elastic member secured to the tether strap to form a second bite in the tether strap that extends between ends of the second elastic member, the second elastic member acting to pull the second set of tension indicator portions through a second aperture in the child safety seat and out of view when no tension is applied to the tether strap; and
    a slide disposed on the tether strap between the first elastic member and the second elastic member, the slide being configured to secure the tether strap to a backrest of the child safety seat;
    wherein the tension indicator portions are configured to be visible:

when the tension indicator portions are in the revealed position and the child safety seat is positioned on a vehicle seat in a forward facing position, and when the tension indicator portions are in the revealed position and the child safety seat is positioned on a vehicle seat in a rearward facing position.

9. The indicator means according to claim 8 wherein the tension indicator portions are positioned on the tether strap on both sides of the child safety seat.

10. The child safety seat in accordance with claim 8 comprising the indicator means.

11. The child safety seat in accordance with claim 8 comprising the indicator means, and wherein the tether strap extends from both sides of the head end and exits both sides of the head end via the first aperture and the second aperture in the head end.

12. An indicator means for a child safety seat for positioning within a motor vehicle, the indicator means comprising:
   a tether strap secured to a head end of the child safety seat and configured to be secured to an anchor point, wherein the tether strap extends from both sides of the head end of the child safety seat to the anchor point; and
   a tension indicator means disposed on the tether strap, wherein the tension indicator means shows that the tether strap has at least had all slack removed therefrom by revealing an indication when the indication passes through an aperture in the child safety seat due to the tether strap being extended, wherein the tension indicator means is disposed on opposing sides of a same portion of the tether strap and provides the indication from both sides of the tether strap;

wherein the indication is configured to be visible:
   when the tether strap has at least had all slack removed therefrom and the child safety seat is positioned on a vehicle seat in a forward facing position, and
   when the tether strap has at least had all slack removed therefrom and the child safety seat is positioned on a vehicle seat in a rearward facing position.

13. An indicator means according to claim 12 wherein the tension indicator means is positioned on the tether strap on one side of the child safety seat.

14. An indicator means according to claim 12 wherein tension indicator means is positioned on the tether strap on both sides of the child safety seat.

15. An indicator means for a child safety seat for positioning within a motor vehicle, the indicator means comprising:
   a tether strap secured to a head end of the child safety seat and configured to be secured to an anchor point, wherein the tether strap extends from the head end of the safety seat to the anchor point; and
   a tension indicator means on the tether strap, wherein the tension indicator means shows that the tether strap has at least had all slack removed therefrom by revealing an indication when the indication passes through an aperture in the child safety seat due to the strap being extended, wherein the tension indicator means is disposed on opposing sides of a same portion of the tether strap and provides the indication on both of the strap to indicate tension regardless of whether the tether strap extends to the anchor point and away from the child safety seat positioned on a vehicle seat in a forward facing position or a rearward facing position.

* * * * *